(No Model.)  4 Sheets—Sheet 1.

S. Z. DE FERRANTI.
ELECTRIC METER.

No. 338,588.　　　　　　　　　Patented Mar. 23, 1886.

Witnesses　　　　　　　　　　　　Inventor
　　　　　　　　　　　　　　　　S. Z. de Ferranti
　　　　　　　　　　　By his Attorneys (No Model.) 4 Sheets—Sheet 2.
S. Z. DE FERRANTI.
ELECTRIC METER.
No. 338,588. Patented Mar. 23, 1886.
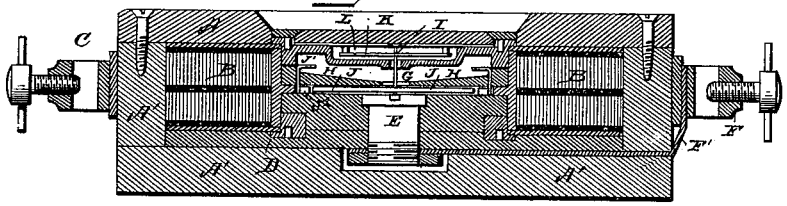
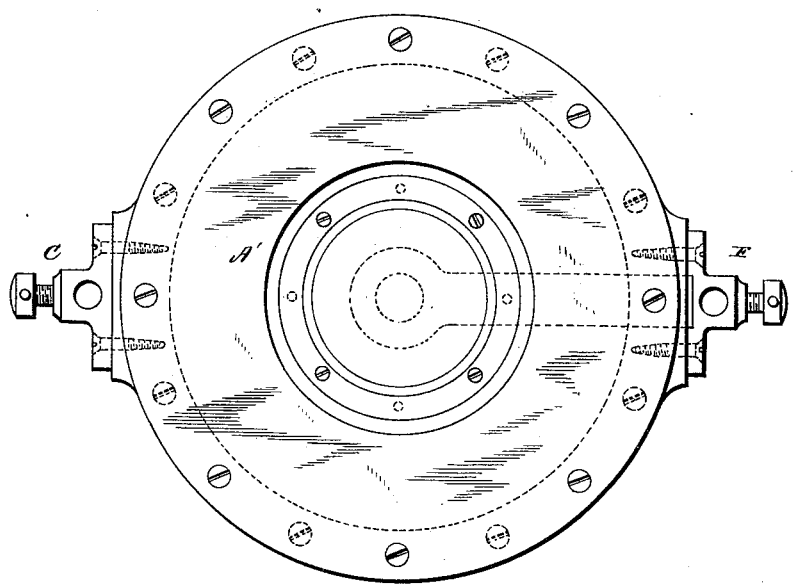
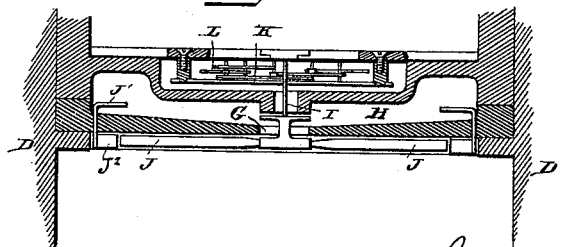
Witnesses
Inventor
S. Z. de Ferranti
By his Attorneys (No Model.) 4 Sheets—Sheet 3.
S. Z. DE FERRANTI.
ELECTRIC METER.
No. 338,588. Patented Mar. 23, 1886.
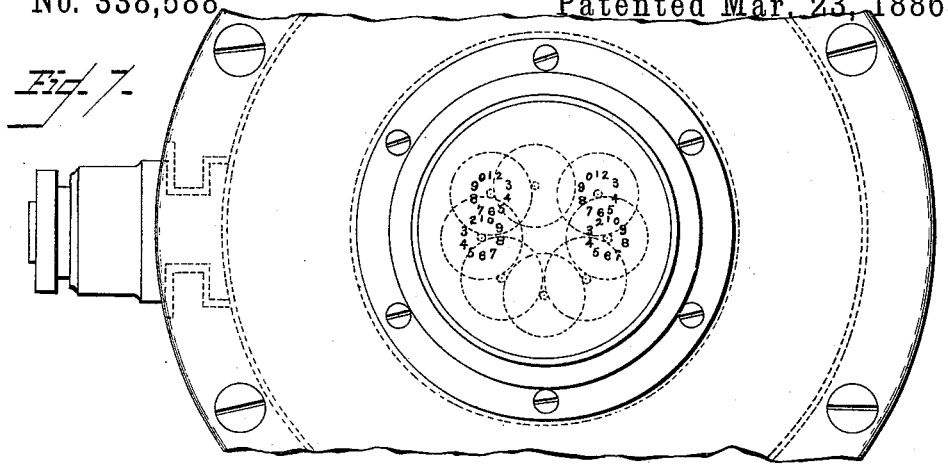
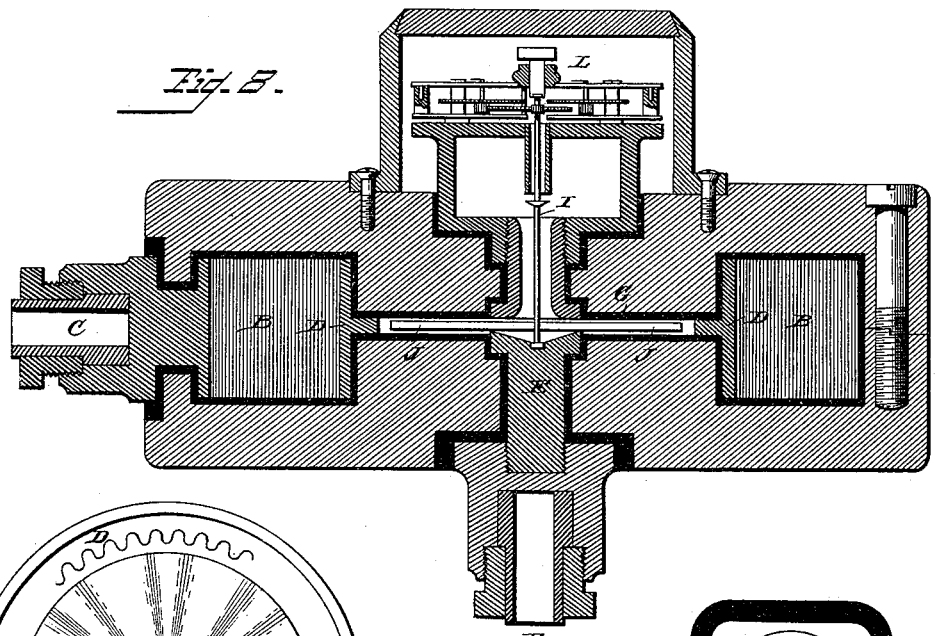
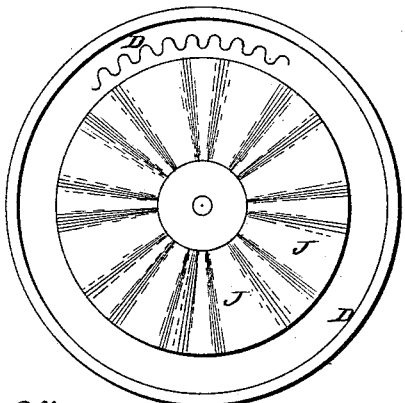
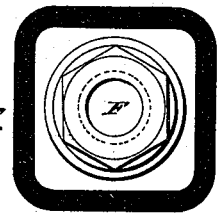

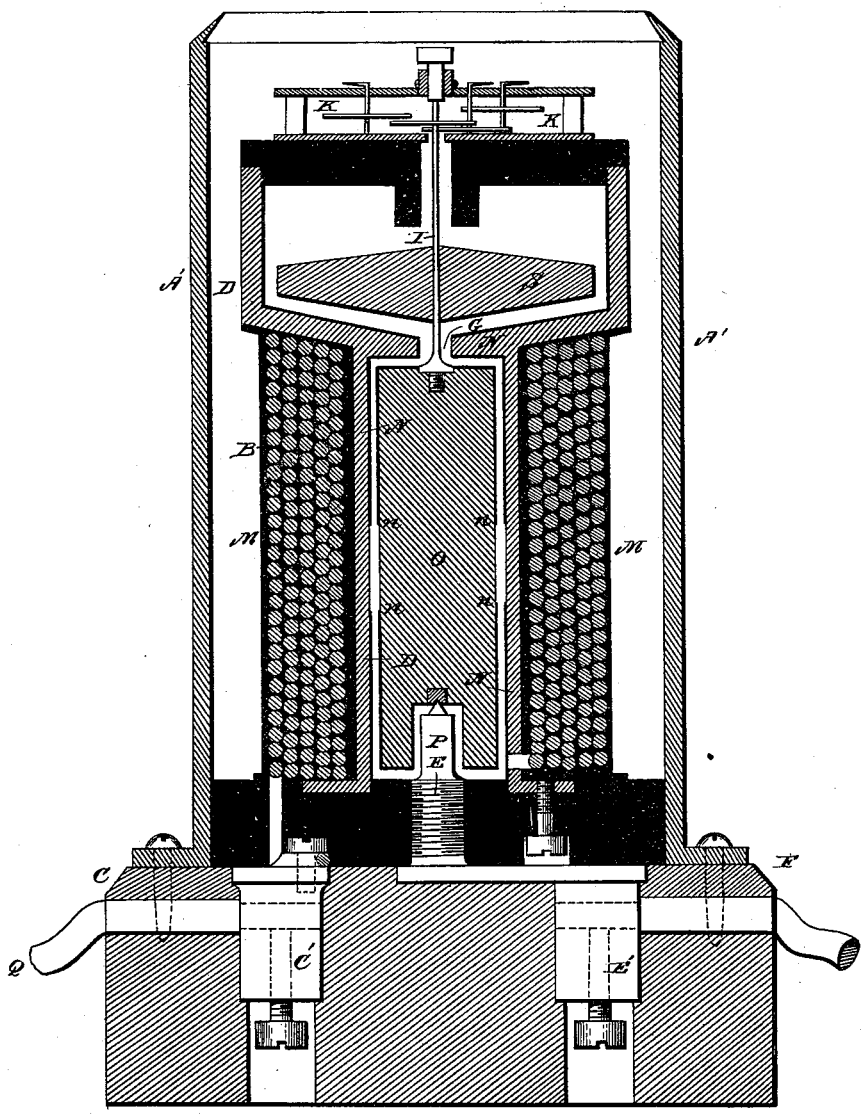

UNITED STATES PATENT OFFICE.

SEBASTIAN ZIANI DE FERRANTI, OF WEST KENSINGTON, COUNTY OF MIDDLESEX, ENGLAND.

ELECTRIC METER.

SPECIFICATION forming part of Letters Patent No. 338,588, dated March 23, 1886.

Application filed October 6, 1884. Serial No. 144,810. (No model.) Patented in England December 29, 1883, No. 5,926.

*To all whom it may concern:*

Be it known that I, SEBASTIAN ZIANI DE FERRANTI, a subject of the Queen of Great Britain, residing at No. 5 Stanwick Road, West Kensington, in the county of Middlesex, England, electrician, have invented certain new and useful Improvements in Electric Meters, (for which I have received Letters Patent in Great Britain, No. 5,926, dated December 29, 1883,) of which the following is a specification.

In the particular form of apparatus which I have shown, and will now describe, I construct an electric meter in such manner that the current to be measured is made to pass radially through a circular bath of mercury, or it might be other conducting-liquid or a conductor immersed therein, and is also made to pass through insulated conducting-coils surrounding the circumference of the bath or a magnet pole-piece below or above it, and the rotation caused by the passage of the current is communicated to a central axis, and is recorded by recording mechanism.

My invention consists in an electric meter in which the current to be measured is passed through mercury or other conducting-liquid in a magnetic field, so disposed with reference to the mercury that when a current passes the mercury is put into motion, and the movement of the mercury recorded by any suitable recording mechanism. In such an organization the movement, disturbance, or action of the mercury must be proportional to the current.

So far as I am aware, I am the first to produce a meter acting on the general principle above stated. Obviously, the broad feature of the invention is capable of embodiment in various forms.

Figure 1:
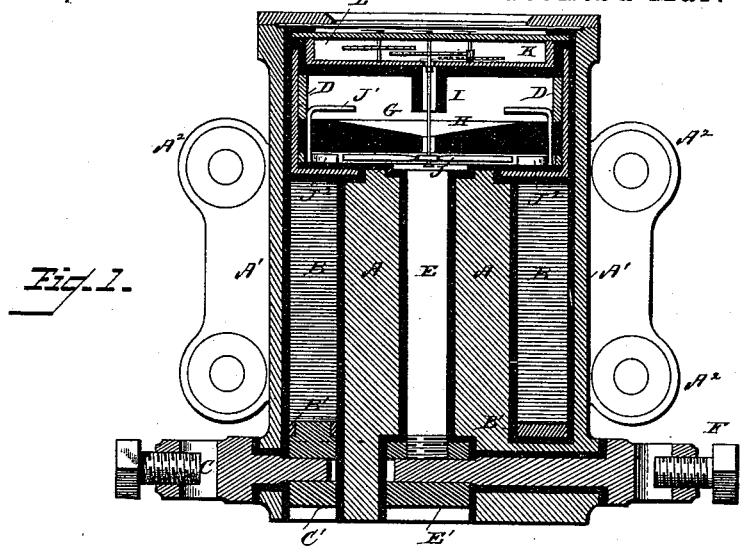
Figure 2:
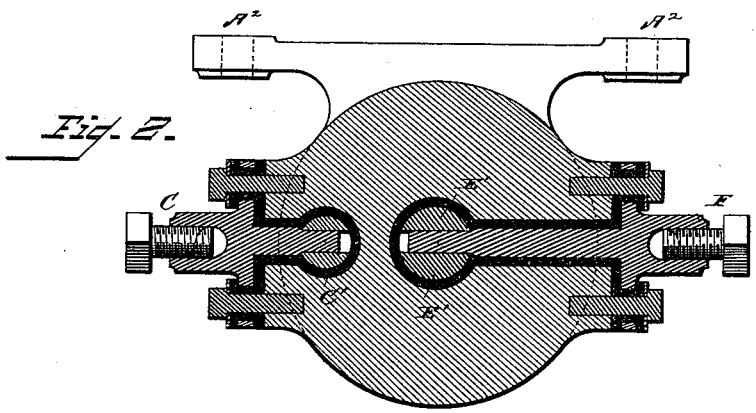
Figure 3:
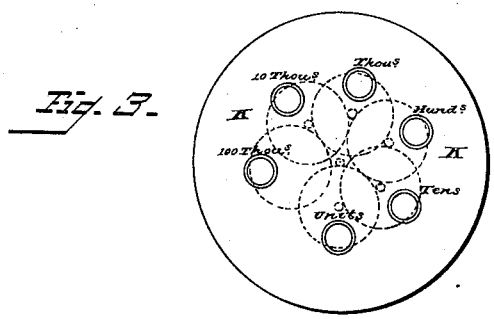

Figure 1 is a vertical section, Fig. 2 a horizontal section, and Fig. 3 a plan view, of the meter. Fig. 4 is a vertical section, Fig. 5 a plan view, of a modified form of the meter. In this modification the meter is formed without any magnet pole-pieces. Fig. 6 shows a vertical section, on a larger scale, of the recording-train of wheels of the apparatus shown at Fig. 4. Fig. 7 is a part plan view, and Fig. 8 a vertical section, of another modified form of the meter. Fig. 9 is a part plan view of the mercury-bath of this meter and of a disk within it, which is to be carried round by the current. Fig. 10 is an under-side view of the bottom terminal of the meter. Fig. 11 is a vertical section of another modification, in which the mercury is to a great extent displaced by a solid conductor.

In Figs. 1, 2, and 3, A is an annular magnet-core surrounded on its exterior with an insulated conducting-coil, B. In the construction shown this coil is lodged in an annular recess between the core A and an outer cylinder, A', which forms the outer casing of the whole apparatus.

The core A and outer cylinder, A', may be formed in one piece, as shown, and the outer cylinder may, as is also shown, be provided with projecting lugs $A^2$, by which it may be secured to a wall or other support. The lower end of the coil is in electrical connection with a copper ring, B', which is coupled to the terminal C. The way in which it is so coupled to the terminal is clearly shown by the drawings. A hole is bored vertically through the solid bottom of the cylinder A', and opens into the bottom of the annular space between A and A'. The copper ring B' lies at the bottom of the annular space. A metallic pin, C', is inserted into the hole, and its end is screwed into a hole in the ring B'. Another hole is bored horizontally from the exterior of the cylinder into the above-mentioned hole and into the pin C'. The inner end of the terminal C is inserted into this horizontal hole, and so is in metallic connection with the ring B'. The way in which the terminal C is fixed to the side of the cylinder A' is clearly shown in Fig. 2. The upper end of the coil is in electrical connection with cylinder D, which stands upward above the top of the magnet-core.

The way in which the upper end of the coil is put into connection with the cylinder D is as follows: The cylinder D is closed at the bottom. The end of the coil is brought into connection with the bottom of the cylinder. At the point where the two are brought into connection the filling of insulating material, which in Fig. 1 is shown as being interposed between them, is removed.

E is an insulated metallic conductor passing downward through the center of the core A to a terminal, F. The way in which it is connected to the terminal F is as follows: The lower end of the hole through the core A is enlarged. Into this enlarged portion of the hole is inserted a short cylinder, E', of metal. The lower end of the conductor E is screwed into the cylinder E'. A horizontal hole is also bored through the solid bottom of the cylinder A' and into the short cylinder E'. The inner end of the terminal F is inserted into this hole, and thereby brought into metallic connection with the conductor E.

The way in which the terminal F is secured to the side of the cylinder A' is clearly shown in Fig. 2.

Wherever the parts are required to be insulated one from another insulating material is interposed between them.

In Figs. 1 and 2 the thick black lines indicate insulating material. The upper end of the conductor E is on a level with the top of the insulating material with which the top of the core A and the inner surface of the bottom of the cylinder D are covered. The bottom of the cylinder D is in this way entirely closed, and forms a trough or receptacle, G, which is to be partly filled with mercury. The outer rim of the trough is, as shown, formed by the metallic cylinder D, so that when an electrical current passes from the terminal C through the coil B to the cylinder D it then passes radially through the mercury to the conductor E, and so to the terminal F. When a current so passes radially through the mercury and through the circular coil B, the mercury is thereby caused to revolve within the trough.

H is an ebonite disk, fixed at a short distance above the bottom of the trough G. The space between them is entirely filled with the mercury, and the mercury also rises up a short distance through a hole formed through the center of the disk. In this way the greater part of the mercury in the trough is covered over and always maintained clean.

I is a light spindle passing downward through the hole in the center of the disk. Its lower end steps into a jewel-bearing in the top of the conductor E. It has also arms J radiating from it into the space between the bottom of the trough and the disk. These arms may be made of metal, and then a portion of the current would be conducted through them. The arms, it will be observed, are totally immersed in the mercury. This is a matter of importance, as great resistance is offered by mercury to the movement of any body which in moving divides the surface of the mercury. The upper end of the spindle I has a wheel upon it, which, when the spindle is rotated, gives motion to a recording train of wheels K, such as shown in the plan view, Fig. 3. This train of wheels is contained within a metallic case, L, carried within the upper part of the cylinder D and insulated therefrom, as shown. In this way, when the mercury is caused to rotate in the trough by the passage of an electrical current through it, the mercury will carry round with it the radial arms J, and will so revolve the spindle I and cause the pinion which it carries to give motion to the train of recording-wheels K. If the arms J J be of conducting material, the current flowing through them will tend to cause rotation independently of the mercury.

In order to prevent the mercury from rotating too freely in the trough, I provide around the circumference of the trough a number of pins, J', which have blades $J^2$ projecting from them in the space between the bottom of the trough and the disk. The pins can be turned so as to set these blades at any desired angle, and thereby more or less retard the mercury from rotating in the trough.

To admit of the pins being readily turned, their upper ends are bent over into a horizontal position, as shown at Fig. 1, so as to form them into crank arms or handles. The pins pass downward through holes in the disk H, and work stiffly in these holes, so that they will remain in any position into which they may be turned by their crank-handles. In this way the blades $J^2$ can readily be set to any angle desired. The bottom of the trough and of the disk might also have short studs or projections standing out from them, so as to offer still more impediment to a quick rotation of the mercury in the trough, and so that the resistance offered to the rotation of the mercury shall become greater and greater as the speed of rotation increases.

In the meter shown at Figs. 4, 5, and 6 the magnet-core is suppressed, and the coil B is made to surround the mercury-bath. In these figures, G is the bath of mercury.

E is the insulated conductor, passing downward through the center of the bottom of the bath to a terminal, F. The way in which its lower end is put into metallic connection with the terminal by means of a metallic strip, F', is clearly shown in Figs. 4 and 5. The outer ends of the coils B are led out through a slit in the outer casing, and put into metallic connection with the terminal C.

B are insulated coils connected at one end to the terminal C and at the other to the metal cylinder D, which forms the outer rim of the mercury-bath.

J are the radial arms extending from the vertical spindle I.

H is a disk forming a cover for the mercury in the bath.

L is the casing containing the recording train of wheels K, which are shown separately on a larger scale at Fig. 6.

The other parts of the meter, which are similar to those in the meter shown at Figs. 1, 2, and 3, are marked with the same letters of reference. The current, as in the meter first described, passes from the terminal C, then through the insulated coils B to the cylinder D, from whence it passes through the mercury to the central conductor, E, and by the strip F' to the other terminal, F.

In the meter shown at Figs. 7, 8, 9, and 10 the parts are marked with the same letters of reference as in the preceding figures. It differs from the meter just described mostly in the form of the parts and in a corrugated disk, J, being carried by the axis I, instead of a number of radial arms.

In Fig. 11, B is a coil of insulated wire wound on a hollow brass bobbin, D. The interior of the bobbin is coated with shellac or other insulating-varnish, except at the part marked $nn$. The hollow interior of the bobbin forms a mercury-bath; but the greater part of the space is occupied by a soft-iron or or other metal conductor, O, which rests upon a conducting-pivot at P, and is entirely submerged in the mercury.

The parts which serve the same purpose as the parts of the meter shown at Figs. 1, 2, and 3 are marked with the same letters of reference.

The current to be recorded by the meter passes by the coil B from the terminal C to the bobbin D, thence through the mercury in the mercury-bath, the conductor O, and pivot P to the terminal F. The rotation of the mercury in the bath of the conductor O immersed therein results, and this motion is communicated by the spindle I to the train of counting-wheels.

S is a weight just balancing the flotation of O. This weight is above the surface of the mercury.

It will be seen in each form of the meter shown in the drawings that the vertical spindle I passes through the bottom of the chamber which contains the recording train of wheels, and communicates motion thereto with the least possible disturbance of the surface of the mercury. There is a tube projecting downward from the hole through which the spindle passes, so that even if the meter were inverted the mercury would not flow into the chamber containing the recording-wheels.

The mercury-bath need not of necessity be a shallow flat bath, such as shown in the drawings. It might be of other form—say, for example, in the form of a bell.

It is clear that the meter could be arranged with the core above instead of below the mercury-bath. For instance, it is only necessary to assume Fig. 1 to be inverted, proper precautions being then taken to prevent the escape of mercury from the bottom of the bath, where the spindle I passes from it. In that case the spindle I might be carried upward through a hole formed centrally through the conductor E, and the recording train of wheels be placed at the top of the meter instead of at the bottom, as it would be if Fig. 1 were inverted.

Having now described and ascertained the nature of my said invention and in what manner the same is to be performed, I declare that what I claim is—

1. The combination, in an electric meter, of ($a$) a bath of mercury (or other conducting-liquid) through or across which the current to be measured is made to pass radially, ($b$) a magnet or a coil of an insulated conductor through which the current is also passed, in the magnetic field of which the bath is located, and ($c$) mechanism for recording the rotation set up within the mercury-bath by the passage of the current.

2. The combination, in an electric meter, of ($a$) a bath of mercury (or other conducting-liquid) through or across which the current to be measured is made to pass radially, ($b$) a magnet or a coil of an insulated conductor through which the current is also passed, in the magnetic field of which the bath is located, ($c$) a solid totally submerged in the mercury contained in the bath, and ($d$) a spindle passing upward from the said solid to the recording mechanism.

3. In an electric meter, the combination of a body of mercury (or other conducting-liquid) through which the current to be measured is passed, a magnet or electric coil, in the field of which said body of mercury (or other conducting-liquid) is disposed, so that when a current passes the mercury is caused to move or travel in its receptacle, and recording mechanism for making a record of such movement or action of the mercury or other conducting-liquid.

SEBASTIAN ZIANI DE FERRANTI.

Witnesses:
G. W. WESTLEY,
GEO. J. B. FRANKLIN,
    *Both of 17 Gracechurch St., London.*